Oct. 24, 1967  D. W. HAWK  3,348,888
MOTOR SCRAPER HITCH
Filed March 12, 1965
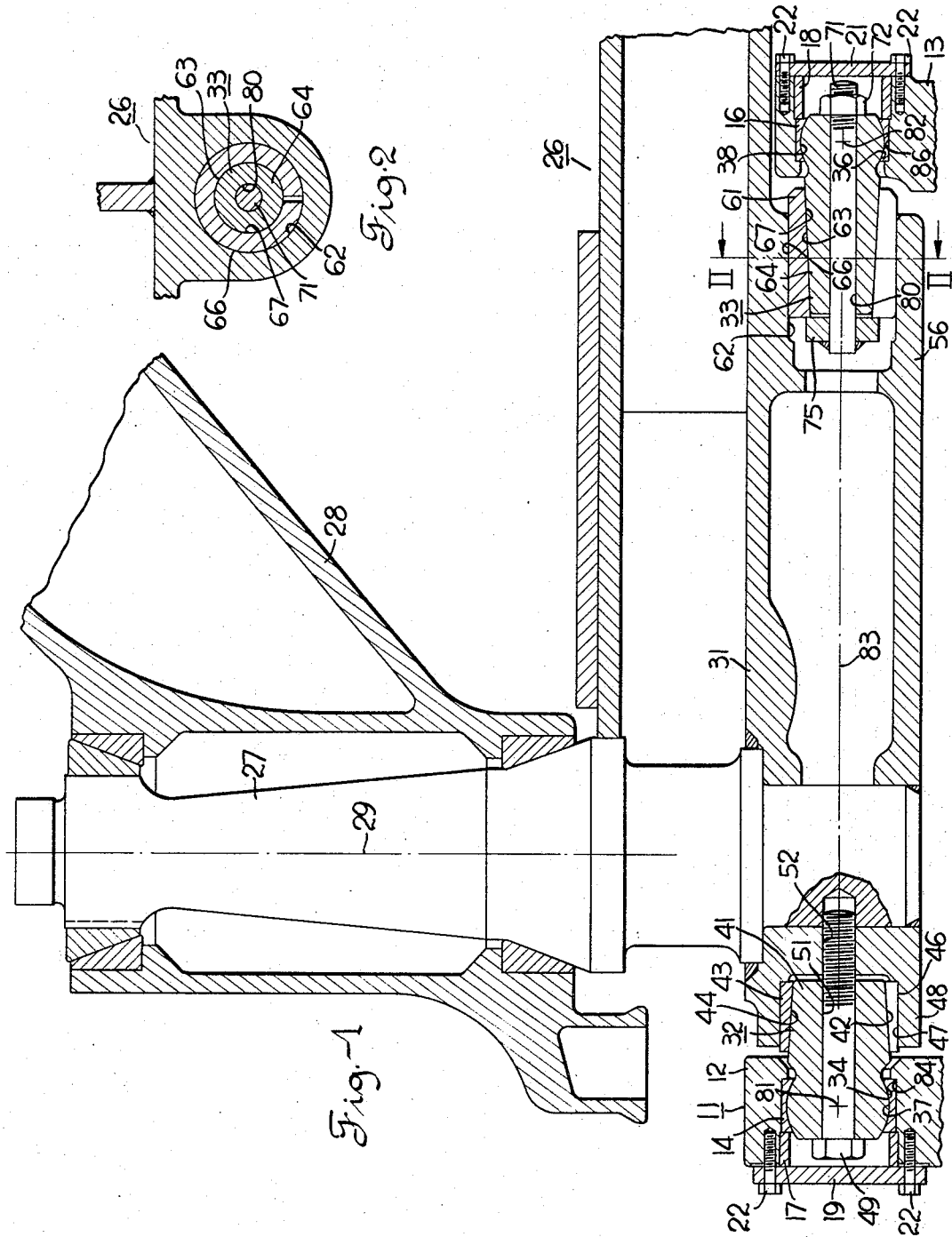
Inventor
Dale W. Hawk
By Charles L. Schwab
Attorney

United States Patent Office 3,348,888
Patented Oct. 24, 1967

3,348,888
MOTOR SCRAPER HITCH
Dale W. Hawk, Marion, Iowa, assignor to Allis-Chalmers
Manufacturing Company, Milwaukee, Wis.
Filed Mar. 12, 1965, Ser. No. 439,239
5 Claims. (Cl. 308—72)

ABSTRACT OF THE DISCLOSURE

This invention relates to a draft connection for tractor and trailer units having spaced self-aligning pivot connections wherein one of the connections includes a split and tapered sleeve for rigidly securing a pivot component.

---

It is a primary object of this invention to provide an improved draft connection permitting liberal manufacturing tolerances.

It is a further object of this invention to provide a self-aligining draft hitch structure having a pair of spaced ball and socket type pivot connections which compensate for manufacturing deviations.

It is a further object of this invention to provide an improved draft connection having a pair of spaced and aligned pivot parts, one of which carries axial and radial loads and the other of which carries primarily radial loads.

It is a further object of this invention to provide a hitch connection as outlined in the previous objects which is easy to assemble and disassemble and is serviceable by a mechanic using simple tools.

These and other objects and advantages of this invention will be apparent to those familiar with the art when the following description is read in conjunction with the drawings in which:

FIG. 1 is a longitudinal section view of a hitch incorporating this invention; and FIG. 2 is a section view taken on the line II—II in FIG. 1.

As shown in the drawings, my invention is incorporated in an articulated hitch of the type used in motor scrapers. The tractor structure 11 includes a pair of longitudinally spaced bearing supports 12, 13 in which a pair of aligned sockets 14, 16 are rigidly secured by sleeves 17, 18 and end plates 19, 21 secured to the supports by cap screws 22. The supports 12, 13 are fixed in their position relative to one another similar to the construction shown in U.S. Patent No. 2,885,022. An intermediate hitch structure 26, which interconnects the tractor structure 11 and a trailer 28, includes a vertical kingpin 27 pivotally connected to the trailer 28 on a vertical axis 29 and a cast longitudinal portion 31 carrying pivot parts 32, 33 defining the longitudinal pivot axis 83 of the draft connection of this invention.

The pivot parts 32, 33 have spherical convex bearing surfaces 34, 36 formed thereon complementary to the concave spherical bearing faces 37, 38 of the cooperating sockets 14, 16. In order to withstand the loads to which motor scraper hitches are subjected in use, the pivot parts are rigidly secured to their supporting structures and a very close pivotal fit is provided between the bearing faces 37, 38 of sockets 14, 16 and the bearing surfaces 34, 36 of ball-like parts 32, 33. The close fit prevents pounding out of the sockets.

In order to rigidly secure the front pivot part 32 to cast portion 31, I provide shank portion 41 with a radially outward facing conical surface 42 and a longitudinally split sleeve 43. The sleeve 43 has a radially inward facing conical face 44 complementary to and in confronting relation to the conical surface 42. The radially outward facing cylindrical face 46 of the split sleeve 43 is in confronting relation to a cylindrical surface 47 in end wall 48 of hitch structure 26. To complete the rigid mounting of pivot part 32 on hitch structure 26, an axial thrust transmitting cap screw 49 extends through central bore 51 of pivot part 32 and has its threaded end screwed into a threaded opening 52 of cast portion 31. As the cap screw 49 is tightened the sleeve 43 is radially expanded into firm engagement with cylindrical surface 47 by virtue of the camming action between the conical surface 42 and the conical face 44. During assembly of the hitching arrangement, the front pivot part 32 is rigidly secured to hitch structure 26 first and then the rear pivot part 33 is tightly mounted in an opening in the rear wall 56 of structure 26.

An axially adjustable and longitudinally split sleeve 61 is provided between the opening defined by cylindrical surface 62 and a radially outward facing conical surface 63 formed on a shank portion 64 of rear pivot part 33. The split sleeve 61 has a cylindrical outer face 66 engageable with cylindrical surface 62 and a radially inward facing conical face 67 complementary to and in confronting relation to conical surface 63. Since the sleeve 61 is shiftable axially, liberal tolerances may be provided for spacing the pivot centers 81, 82. An axial thrust transmitting means in the form of a bolt 71 and a nut 72 are provided to expand the sleeve 61. The bolt has a head 75 in engagement with sleeve 61 and extends through an axial passage or bore 80 in pivot part 33. As the nut 72 is tightened on the threaded end of bolt 71, the conical surface 63 and the conical face 67 cammingly engage to radially expand the sleeve 61 into firm engagement with cylindrical surface 62 of the wall 56. At the same time the sleeve 61 will shift axially relative to cylindrical surface 62.

The front pivot connection is designed to carry part of the radial load and all the draft load in the direction of axis 83. For this purpose the front ball and socket joint 14, 32 is of larger diameter than the rear ball and socket joint 16, 33. The rear pivot connection carries little if any axial load, but rather is designed to carry radial load, as does the front pivot connection. It is obvious, of course, that the cylindrical face 66 will frictionally engage cylindrical surface 62 as the sleeve 61 is radially expanded; however, the engagement is such that only a very minor amount of axial load is carried by such friction connection.

The pivot parts 32, 33, sleeves 43, 61 and sockets 14, 16 are substantially aligned on the longitudinal hitch axis 83 defined by the centers 81, 82 of spherical surfaces 34, 36. However, my draft connection permits the cylindrical mounting surfaces 84, 86, for sockets 14, 16 and cylindrical surfaces 47, 62 for the split sleeves to be out of alignment with one another to some extent without creating installation or operational problems. Also the relative axial positioning of the sockets 14, 16 need not be held to close tolerances since the sleeve 61 adjusts axially relative to the hitch structure 26 as the pivot part 33 is installed in hitch structure 26. Thus manufacturing costs are held to a minimum.

Assembly and disassembly of my hitch is relatively simple, thus providing low labor cost assembly and disassembly. The axial thrust transmitting connecting means 49, 71 may be readily loosened upon removal of cover plates 19, 21, thus my design simplifies servicing and repair, if required.

The embodiments of the invention for which an exclusive property or privilege is claimed are defined as follows:

1. In combination with a pair of structures, a draft connection therebetween permitting pivoting of said structures about a common axis and comprising:

a pair of spaced spherical sockets on one of said structures aligned on said axis, a pair of spaced pivot parts having spherically formed bearing surfaces complementary to and in pivotal bearing engagement with said sockets, respectively, means rigidly securing said pivot parts to the other of said structures including, walls in said other structure defining an opening bounded by a radially inward facing cylindrical surface aligned on said axis, a shank portion on one of said pivot parts extending into said opening and having a radially outward facing conical surface substantially aligned on said axis, a longitudinally split sleeve in said opening having
- a radially outward facing cylindrical face in confronting relation to said cylindrical surface, and
- a radially inward facing conical face complementary to and in confronting relation to said conical surface on said shank portion, and
- axially adjustable thrust transmitting means operable to adjust said sleeve relative to said one part thereby causing said conical surface and face to cammingly engage and radially expand said sleeve into firm engagement with said cylindrical surface thereby rigidly securing said one pivot part and sleeve to said other structure.

2. The structure set forth in claim 1 wherein said axially adjustable thrust transmitting means includes a bolt having a head in axial engagement with the end of said sleeve remote from the bearing surface on said one part and a nut threadedly engaging said bolt and in axial thrust transmitting relation to the end of said one part remote from said shank portion.

3. In combination with a pair of structures, a draft connection therebetween permitting pivoting of said structures about a common axis and comprising:

a pair of spaced spherical sockets on one of said structures aligned on said axis, a pair of spaced pivot parts having spherically formed bearing surfaces complementary to and in pivotal bearing engagement with said sockets, respectively, a longitudinally extending portion on the other of said structures disposed between said spherical sockets, means rigidly securing said pivot parts to opposite ends of said longitudinally extending portion whereby said pivot parts extend therefrom in axially opposite directions including, walls in said other structure defining an opening bounded by a radially inward facing cylindrical surface aligned on said axis, a shank portion on one of said pivot parts extending into said opening and having a radially outward facing conical surface substantially aligned on said axis, a longitudinally split sleeve in said opening having
- a radially outward facing cylindrical face in confronting relation to said cylindrical surface, and
- a radially inward facing conical face complementary to and in confronting relation to said conical surface on said shank portion, and
- axially adjustable thrust transmitting means operable to adjust said sleeve relative to said one part thereby causing said conical surface and face to cammingly engage and radially expand said sleeve into firm engagement with said cylindrical surface thereby rigidly securing said one pivot part and sleeve to said other structure.

4. The structure set forth in claim 3 wherein said one part has a central axial passage therethrough and said axially adjustable thrust transmitting means includes a bolt extending through said passage.

5. The structure set forth in claim 3 wherein the diameter of said bearing surface on said one part is smaller than the diameter of said bearing surface on the other of said parts.

References Cited

UNITED STATES PATENTS

| | | | |
|---|---|---|---|
| 1,232,714 | 7/1917 | Olson | 308—71 |
| 2,342,407 | 2/1944 | Tourneau | 280—492 |
| 2,470,870 | 5/1949 | Scholten | 287—90 |
| 2,574,773 | 11/1951 | Bannister | 308—70 X |
| 2,828,984 | 4/1958 | Ho Chow | 287—90 |
| 2,937,886 | 5/1960 | Poole | 280—492 |
| 2,998,262 | 8/1961 | Hoffman | 287—90 X |

MARTIN P. SCHWADRON, *Primary Examiner.*

R. F. HESS, *Assistant Examiner.*